US005447318A

United States Patent [19]

Gantz et al.

[11] Patent Number: 5,447,318

[45] Date of Patent: Sep. 5, 1995

[54] UTILITY CABINET FOR GENERAL HOUSEHOLD USE, REPAIRS, HOBBIES AND THE LIKE

[75] Inventors: Carroll M. Gantz, Pittsburgh, Pa.; William C. Sabram, Kentwood, Mich.

[73] Assignee: Leonard Bloom, Towson, Md.

[21] Appl. No.: 197,404

[22] Filed: Feb. 16, 1994

Related U.S. Application Data

[63] Continuation-in-part of Ser. No. 113,438, Aug. 27, 1993.

[51] Int. Cl.[6] .................................... B62B 3/00

[52] U.S. Cl. .................................... 280/38; 280/47.35; 312/237

[58] Field of Search .................... 312/126, 128, 334.36, 312/334.39, 334.42, 237; 280/47.3, 47.35, 30, 38, 651, 79.3; 108/11, 18, 19, 12, 26

[56] References Cited

U.S. PATENT DOCUMENTS

| | | | |
|---|---|---|---|
| 1,094,996 | 4/1914 | Jacoway | 312/126 |
| 1,748,843 | 2/1930 | Kuckel | 312/126 X |
| 2,815,252 | 12/1957 | Baker | 312/334.36 X |
| 2,905,480 | 9/1959 | Giovannelli | 280/47.35 X |
| 3,259,443 | 7/1966 | Lavigne et al. | 312/126 |
| 3,853,329 | 12/1974 | McDonald | 280/47.35 |
| 4,095,861 | 6/1978 | Kachidurian | 312/126 X |
| 4,531,645 | 7/1985 | Tisbo et al. | 312/126 X |
| 4,652,062 | 3/1987 | Greenwood | 280/47.35 X |
| 4,741,628 | 5/1988 | Kinley | 312/334.42 X |
| 4,993,726 | 2/1991 | Schumacher et al. | 280/47.35 X |

*Primary Examiner*—Margaret A. Focarino
*Assistant Examiner*—Michael Mar
*Attorney, Agent, or Firm*—Leonard Bloom

[57] ABSTRACT

A utility cabinet (10) has a plurality of vertically-adjustable shelves (13) for receiving a versatile mobile work station (16) and a plurality of insert trays (18–23) stored in the cabinet (10).

1 Claim, 3 Drawing Sheets

UTILITY CABINET FOR GENERAL HOUSEHOLD USE, REPAIRS, HOBBIES AND THE LIKE

CROSS-REFERENCE TO RELATED APPLICATION

The present invention is a continuation-in-part of copending Gantz et al application, Ser. No. 08/113,438 filed Aug. 27, 1993, for "COMBINATION TRAY AND WHEELED CART", the disclosure of which is incorporated herein in its entirety.

FIELD OF THE INVENTION

The present invention relates to a utility cabinet for general household use, repairs, hobbies and the like, and more particularly, to a cabinet for storing a versatile mobile work station in its folded-up position together with a plurality of insert trays, each of which is adapted for a particular household use.

BACKGROUND OF THE INVENTION

The tools, implements and accessories needed for particular household duties are usually scattered around the home and, invariably, are not conveniently accessible.

For example, the tools, hardware, accessories and the like for normal household repairs and maintenance may be found in the basement workshop or in the garage. As another example, the brushes, window cleaners, general purpose cleaners, sprays, furniture polishes, paper towels and the like may be found in a closet or pantry adjacent to the kitchen. As a further example, the car waxes, metal polishes, sponges and the like may be found in the garage, in the basement, or possibly in the trunk of a car. Moreover, the paper plates, skewers, condiments and implements for a bar-b-que may be found in the kitchen. Finally, the garden implements for potting plants, as well as the top soil, seed packets and the like, may be found in the garage or almost anywhere in the home.

As a result, items are often misplaced or lost, half-used cans and sprays tend to remain more or less forever in a closet or on a basement shelf, and time is wasted in just locating the items needed for a variety of jobs in and around the home. This is disorganized and inefficient and wastes valuable space in the home.

This problem is alleviated by the aforesaid Gantz et al '438 co-pending application, which discloses and claims a portable foldable mobile work station carried to the job site, preferably as a tray, and which is quickly and conveniently erected for mobile use at the job site. A plurality of insert trays is provided for a corresponding plurality of jobs or tasks around the home, and one of the insert trays is selected and is disposed in the mobile work station for a particular job.

SUMMARY OF THE INVENTION

Accordingly, it is the primary object of the present invention to provide a utility cabinet at a central location in the home for a variety of household jobs, repairs, hobbies and the like, wherein only a bare minimum of valuable floor space is used.

In accordance with the teachings of the present invention, the utility cabinet has a plurality of shelves formed therein. A portable foldable work station is on one of the shelves, and a plurality of trays is on the other shelves, each tray being intended for a particular task. As a result, the work station and a selected tray may be removed from the cabinet and carried to a job site, and thereafter the work station may be erected at the job site with the selected tray disposed therein.

The shelves are spaced vertically with respect to each other, and the space therebetween may be adjusted.

In a preferred embodiment, the work station has a main tray, and the selected tray comprises an insert tray disposed within the main tray of the work station. The work station itself comprises a versatile mobile work station including a plurality of legs having casters thereon.

These and other objects of the present invention will become apparent from a reading of the following specification taken in conjunction with the enclosed drawings.

GENERAL DESCRIPTION OF THE PREFERRED EMBODIMENT

Figure 1:
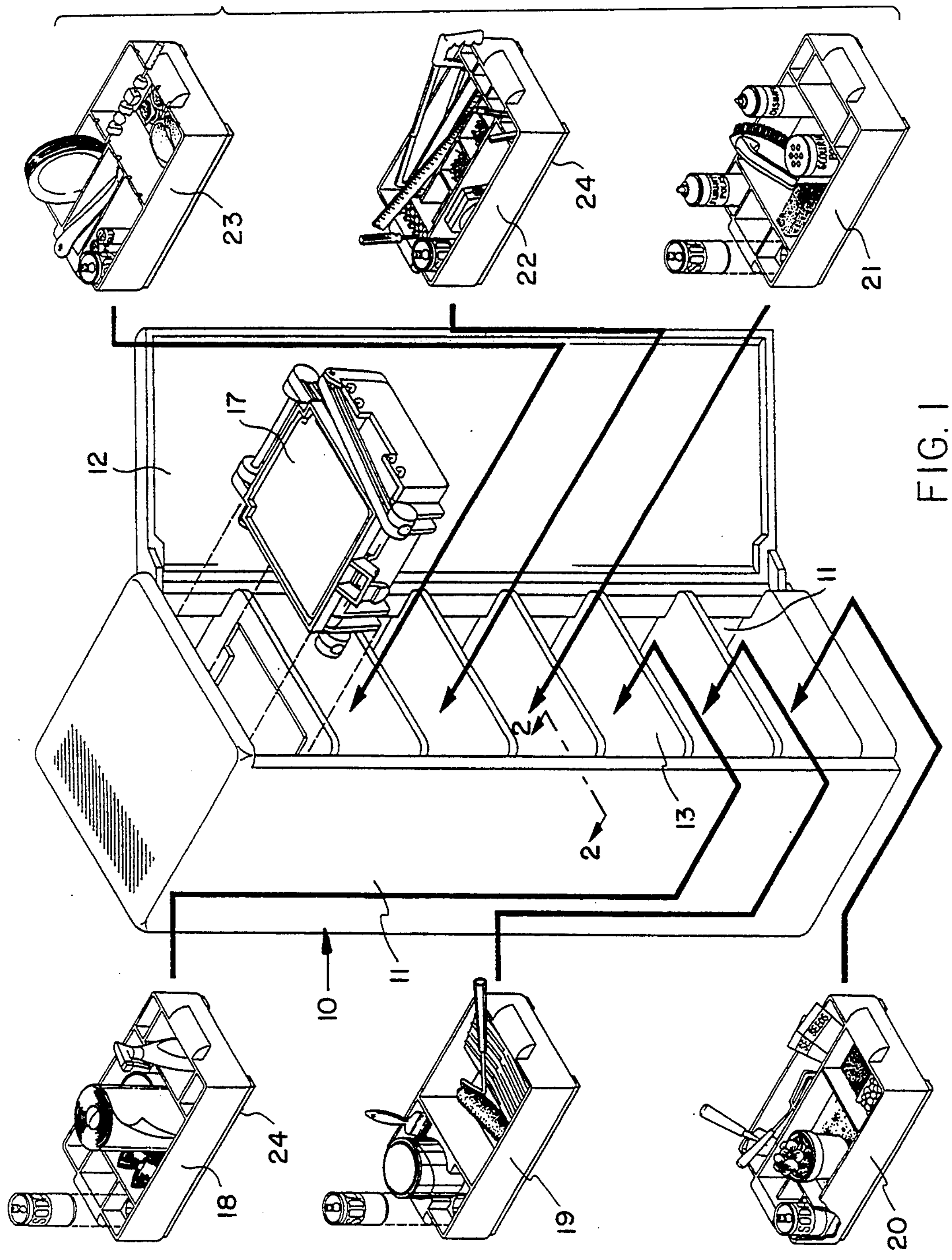
FIG. 1 is a perspective view of the utility cabinet of the present invention showing, in exploded relationship thereto, the versatile mobile work station (in its folded-up position) along with a plurality of insert trays intended to adapt the work station to a variety of jobs found in and around the home.

With reference to FIG. 1, a utility cabinet 10 has respective side walls 11 and further has a hinged door 12 for providing access to a plurality of vertically-spaced shelves 13. These shelves 13 may be vertically adjusted by means of removable brackets 14. The brackets 14 are retained by a pin 15 received in a selected blind bore 16 in the side wall 11, as shown in FIG. 2.

A versatile mobile work station 17 (in its initial folded-up position) is stored in one of the shelves 13, and the remaining shelves 13 receive a plurality of insert trays which adapt the mobile work station 17 for a variety of particular purposes as disclosed and claimed in the aforesaid Gantz et al '438 application. For example, insert tray 18 is intended for car waxing and cleaning; insert tray 19 for indoor painting; insert tray 20 for potting plants and for gardening; insert tray 21 for household cleaning; insert tray 22 for carpentry and general maintenance and repairs; and insert tray 23 for outdoor bar-b-queing. Each of the trays 18–23 may contain the usual tools, implements, accessories and/or supplies for that particular job, so that each insert tray 18–23 is "all set to go".

Thus, the utility cabinet 10 provides a central location for virtually all of the tools, implements, accessories and materials necessary for a wide variety of household tasks as well as repairs, hobbies and crafts. In a preferred embodiment, the utility cabinet is about five feet high and occupies a floor area of around two feet by two feet—a very compact storage area for such a wide variety of uses.

Figure 2:
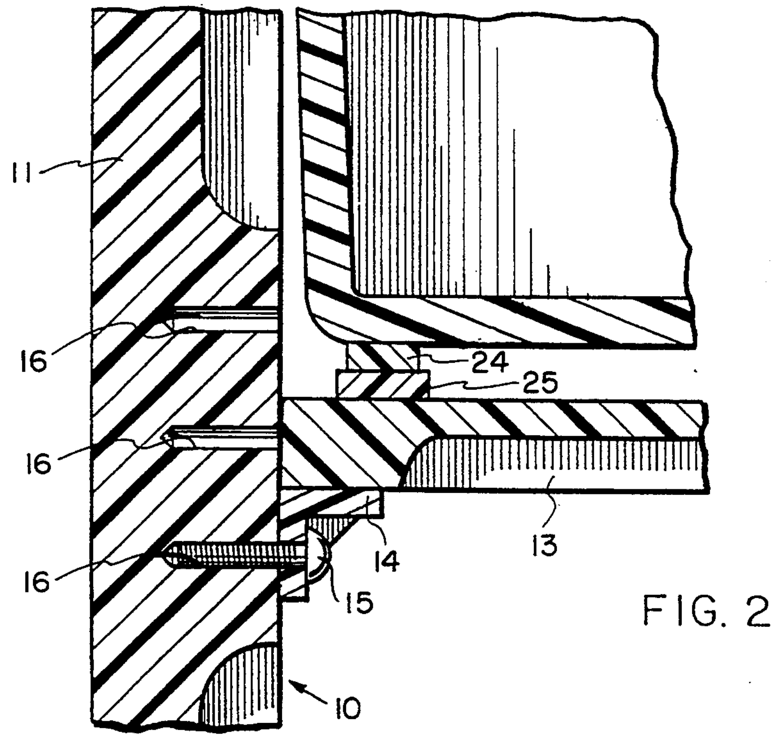
FIG. 2 is a cross-sectional view thereof, taken along the lines 2—2 of FIG. 1 and drawn to a enlarged scale, showing one of the shelves in the cabinet, and further showing the respective insert tray slidably disposed thereon by means of cooperating anti-friction slides, one on the shelf and the other on the insert tray.

Anti-friction longitudinal slides 24 (of nylon or the like) may be mounted to the bottom of each insert tray 18–23 for cooperation with complementary slides 25 on each shelf 13, as shown in FIG. 2.

Figure 3:
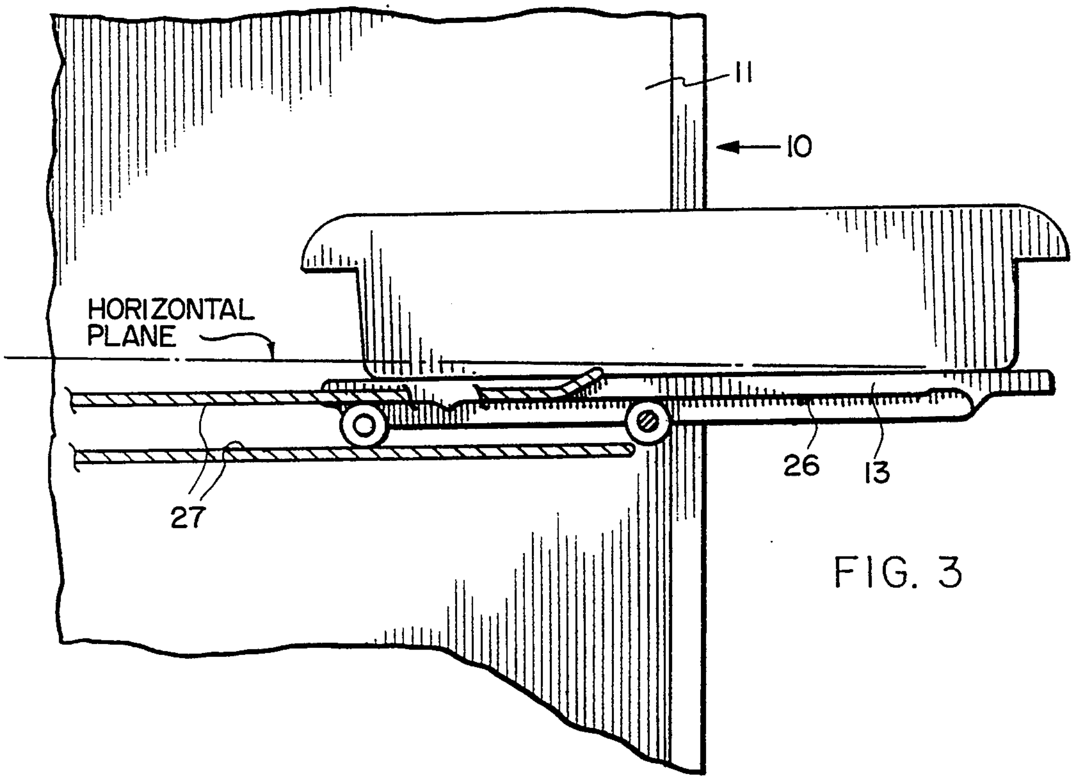
FIG. 3 is a longitudinal sectional view of a modification, wherein the complete shelf is slidably extended from the cabinet, such that the work station and/or a selected one of the insert trays may be easily lifted off of the respective shelf and, thereafter, the shelf may be slidably retracted within the cabinet.

A modification is shown in FIG. 3. There, the entire shelf 13 slides out of the utility cabinet 10 by means of cooperating tracks 26 and 27, respectively. As a result, the desired insert tray 18–23, as well as the versatile mobile work station 17, may be lifted off of the shelf 13 easily and conveniently and, thereafter, the particular shelf 13 may be pushed and retracted back into the cabinet 10, using the cooperating tracks 26 and 27, respectively. Moreover, the cooperating tracks 26 and 27, respectively, are tilted sightly (in a direction from the front to the back of the utility cabinet 10) so that each shelf 13 will normally tend to slide back and retract into the cabinet 10.

Figure 4:
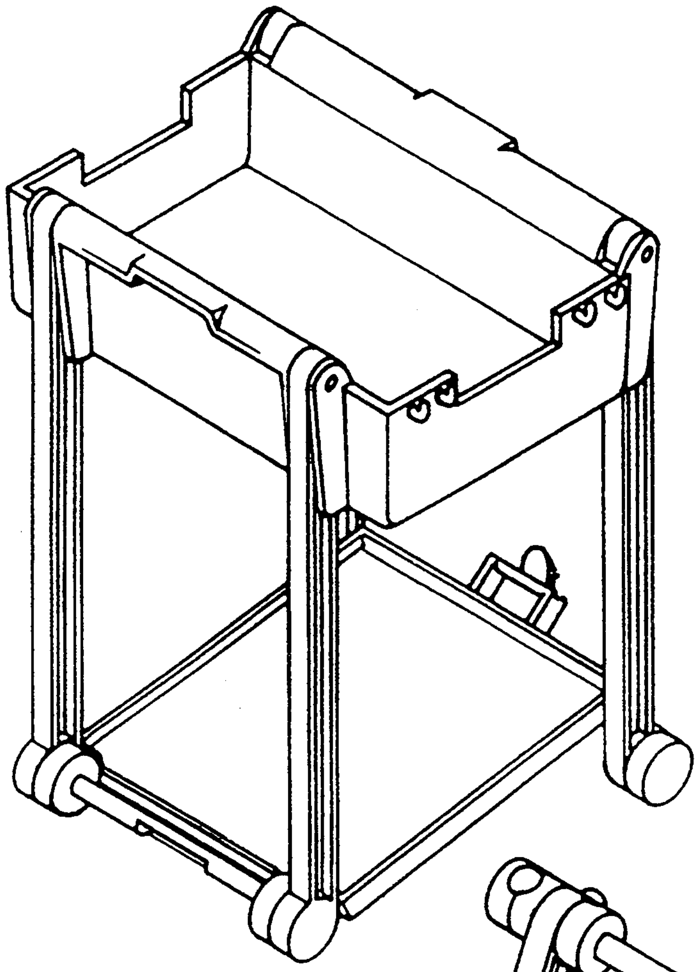
FIG. 4 is a perspective view of the mobile work station in an erected position.
Figure 5:
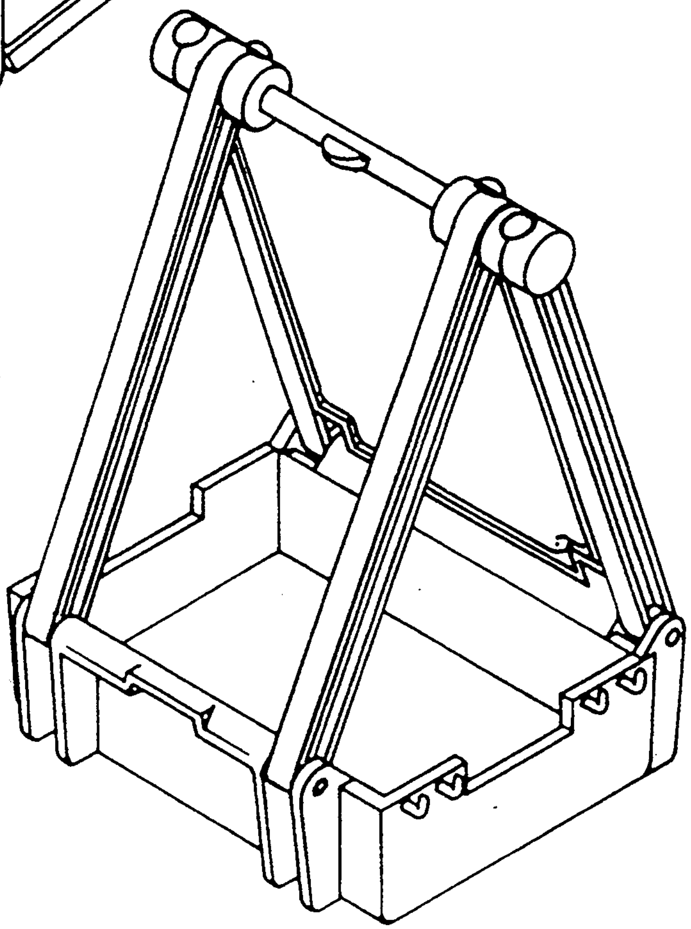
FIG. 5 is a perspective view of the mobile workstation in a carrying position.

The mobile work station is shown in FIG. 4 in its erected position with the pair of leg members pivoted to a downwardly extending position. The open recessed compartment of the main body portion is adapted to receive a selected one of the insert trays. FIG. 5 shows the mobile work station in its carrying position with the pair of leg members pivoted upwardly at an acute angle with respect to the main body portion to form an overhead carrying handle.

Obviously, many modifications may be made without departing from the basic spirit of the present invention. For example, additional insert trays may be used besides the particular insert trays 18–23 disclosed herein. Accordingly, it will be appreciated by those skilled in the art that within the scope of the appended claims, the invention may be practiced other than has been specifically described herein.

What is claimed is:

1. In combination, a portable foldable mobile work station having a main body portion, a plurality of insert trays, a selected one of which is receivable within and occupying a substantial part of an open recessed compartment of the main body portion of the work station, thereby accommodating a variety of tasks, the work station further having a pair of leg members, each leg member legs having respective caster means thereon, and each leg member being pivotably connected to the main body portion thereof, such that the work station has a first folded storage position for compactness in which the leg members are folded and are disposed in an overlapping manner above the recessed compartment of the main body portion of the work station, the work station further having a second intermediate carrying position in which the leg member are pivoted upwardly and away from the main body portion thereof, the leg members extending at an acute angle with respect to the main body portion of the work station to form an overhead carrying handle for the work station, thereby conveniently carrying the selected insert tray when received within the recessed compartment to the job site, and the work station still further having a third erected position in which the leg members are further pivoted outwardly away from the main body portion of the work station and downwardly therefrom to thereby depend from the work station, and a storage cabinet having a plurality of shelf means, one of the shelf means receiving the work station in the first storage position thereof, and the other shelf means receiving the respective insert trays.

* * * * *